United States Patent
Hwang et al.

Patent Number: 5,555,326
Date of Patent: Sep. 10, 1996

[54] OPTICAL WAVEGUIDE INTENSITY MODULATOR USING ELECTRO-OPTIC POLYMER

[75] Inventors: Wol-Yon Hwang; Jang-Joo Kim; Tae-Hyoung Zyung; Min-Chul Oh, all of Daejeon, Rep. of Korea

[73] Assignee: Electronics & Telecommunications Research Inst., Rep. of Korea

[21] Appl. No.: 358,906

[22] Filed: Dec. 19, 1994

[30] Foreign Application Priority Data

Dec. 9, 1994 [KR] Rep. of Korea ............... 94-33476

[51] Int. Cl.$^6$ .................................. G02B 6/27
[52] U.S. Cl. .................... 385/2; 385/28; 385/40; 385/122
[58] Field of Search .................. 385/1–11, 14, 385/27–29, 39, 40, 122, 129, 130

[56] References Cited

U.S. PATENT DOCUMENTS

| | | | |
|---|---|---|---|
| 4,273,411 | 6/1981 | Alferness | 385/40 |
| 4,390,236 | 6/1983 | Alferness | 385/9 |
| 5,078,512 | 1/1992 | Ando | 385/11 |
| 5,317,666 | 5/1994 | Agostinelli et al. | 385/122 |
| 5,361,320 | 11/1994 | Liu et al. | 385/2 X |
| 5,388,001 | 2/1995 | Okayama et al. | 385/4 X |

OTHER PUBLICATIONS

Thackara et al "Poled electro–optic waveguide formation in thin–film organic media"; Appl. Phys. Lett. vol. 52, pp. 1031–1033; 1988 (Mar.).

Reinhart et al "Electrooptic Polarization Modulation in Multielectrode $Al_xGa_{1-x}As$ Rib Waveguides"; IEEE Journal of Quantum Electronics. vol. QE–18, No. 4, pp. 763–766, Apr. 1982.

Alferness et al "Electro–optic waveguide TE←→TM mode converter with low drive voltage"; Optics Letters, vol. 5, No. 11/ pp. 473–475, Nov. 1980.

Schlak et al–"Integrated–Optic Polarisation Convertor on (001)–InP Substrate"; Electronic Letters; vol. 22. No. 17 pp. 883–885, Aug. 1986.

Teng, C. C.: "Traveling–wave polymeric optical intensity modulator with more than 40 GHz of 3–dB electrical bandwidth"; 30 Mar. 1992; Appl. Phys. Lett. 60 (13), pp. 1538–1540; (1992 American Inst. of Physics).

Primary Examiner—John D. Lee
Attorney, Agent, or Firm—Larson and Taylor

[57] ABSTRACT

An optical waveguide intensity modulator of a polymer waveguide utilizes and electro-optic effect and optical birefringence induced from a poling process of a nonlinear polymer thin-film. The optical waveguide intensity modulator is constructed by a series combination of a TE/TM mode selector, a TE or TM mode converter and another TE or TM mode selector. In the polymer waveguide, the mode selectors and mode converter can be easily obtained by making the direction of a poling field to be horizontal (or vertical) and approximately 45° direction. According to the present invention, the optical waveguide intensity modulator is formed by integrating the TE or TM mode selectors and the TE or TM mode converter onto a single substrate. Further, because no element, is required which results in optical loses for example an optical isolator, an optical coupler or a curved portion of the waveguide, the efficiency of the device can be improved.

12 Claims, 3 Drawing Sheets

OPTICAL WAVEGUIDE INTENSITY MODULATOR USING ELECTRO-OPTIC POLYMER

BACKGROUND OF THE INVENTION

1. Technical Field

The present invention relates to an optical signal modulator for an optical communication system, and more particularly to an optical waveguide intensity modulator utilizing a poling effect of non-linear polymer and optical bireferingence and an electro-optic effect induced from the poling effect.

2. Description of the Related Art

For an optical communication system, a number of optical devices, for example light emitting devices, light receiving devices for detecting a light, and optical signal processors for accomplishing optical switching and modulation operation are required. The optical switching devices and optical modulation devices utilizing an electro-optic effect can modulate optical signals by applying an electric field to materials, such as $LiNbO_3$, GaAs, InP, polymer, etc, having nonlinear electro optical characteristics. In such devices, the optical devices using $LiNbO_3$ or GaAs have been mainly developed and used in commercial optical communication systems.

An optical waveguide intensity modulator (hereinafter, referred to as an intensity modulator) is widely used in modulating the optical signal intensity on the outside of a light source, such as a diode laser, so that an optical signal suitable for using in optical communication may be generated. Conventionally, an optical signal modulator has been disclosed in a waveguide structure of a Mach-Zehnder interferometer. Such a modulator is known from an article: [C. C. Teng, "Travelling-wave optical intensity modulator with more than 40 GHz of 3 dB electrical bandwidth", Appl. Phys. Lett. vol. 66, pp. 1538–1540, 1992]. In the known art, the intensity modulator comprises a curved part of a waveguide, and a Y-branch coupler for dividing and combining a propagating light at the ratio of 50 to 50. After the light that has been split into two arms with the same polarization directions is coupled back together after passing through different optical paths, the intensity of the coupled light is modulated by constructive inteference or destructive interference of the isolated lights according to their phase difference. However, in the Y-branch coupler and the curved part there may be a lot of light loss. Moreover, in order to reduce this loss, careful attention must be paid to the design and fabrication process for the arms of the Mach-Zehnder interferometer waveguide.

SUMMARY OF THE INVENTION

The intensity modulator according to the present invention which is constituted of mode selectors for TE or TM mode and a TE-TM mode converter has a simple linear structure, and is possible to reduce the loss brought by the curved structure and the optical Y-branch coupler. The linear structured intensity modulator has been proposed with using an inorganic TE TM mode converter. But, the inorganic mode converter has lower practicality because it is difficult to integrate the mode converter with the mode selector.

A second order polymer thin-film is formed by a molecular alignment process, such as an electrically induced poling, which process is to dope a thin film with various second order non-linear molecules in an optically linear polymer matrix. The ordering of the active nonlinear molecules allows the linear electro-optic effect. Since most nonlinear molecules possess an anisotropic linear polarizability, the poled region also becomes birefringent i.e., the refractive index along the poling field direction is increased but it is decreased along the perpendicular direction. An optical axis of such a thin film is identical to the axis of the poling electric field. When the electric field is applied along the optical axis, an electro-optic effect is exhibited, in which a refractive index is varied in two directions perpendicular and parallel to the direction of the electric field.

It is an object of the present invention to provide an optical waveguide intensity modulator suitable for use in the structure of a polymer waveguide by utilizing the electro-optic effect and an optical birefringence caused by the poling effect.

It is another object of this invention to provide an optical waveguide intensity modulator which is simple and has a lower loss of light.

It is a further object of this invention to provide an optical waveguide intensity modulator which can be easily integrated with a TE-TM mode converter and TE or TM mode selectors and be of great utility.

According to this invention, the optical waveguide intensity modulator comprises a series combination of the first TE or TM mode selector, a TE-TM mode converter and a TE or TM mode selector, wherein the first TE or TM mode selector receives an input light and selectively passes a TE mode or a TM mode of the input light, and has a core layer formed of non-linear polymer being poled to a predetermined direction; and the TE-TM mode converter converts TE to TM mode or TM to TE mode, of an output light from the first TE or TM mode selector by controlling a phase difference between the normal, of the TE-TM mode converter has a core layer being poled to 45° direction with respect to the predetermined direction; the second TE or TM mode selector which is connected to the TE-TM mode converter is to selectively pass a TE mode or a TM mode of an output light emanating from the TE-TM mode converter, and has a core layer being poled to the predetermined direction.

DETAILED DESCRIPTION OF THE INVENTION

Figure 1A:
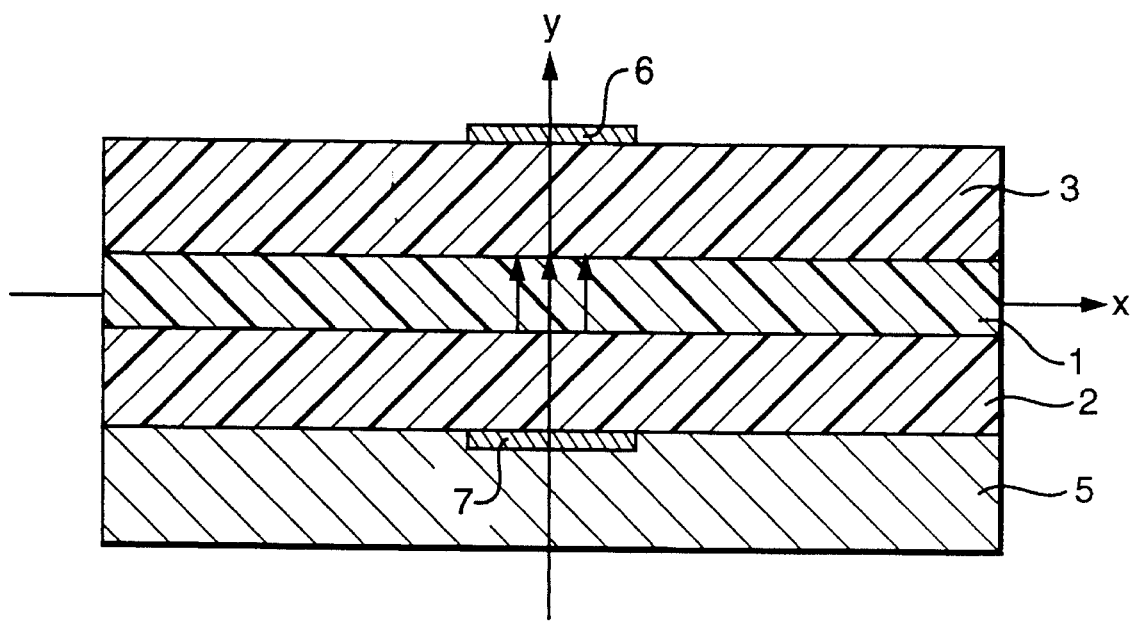
FIGS. 1a and 1b show a cross sectional view of the TM mode selector according to the present invention formed by a vertical poling electric field in a stripe waveguide.
Figure 1B:
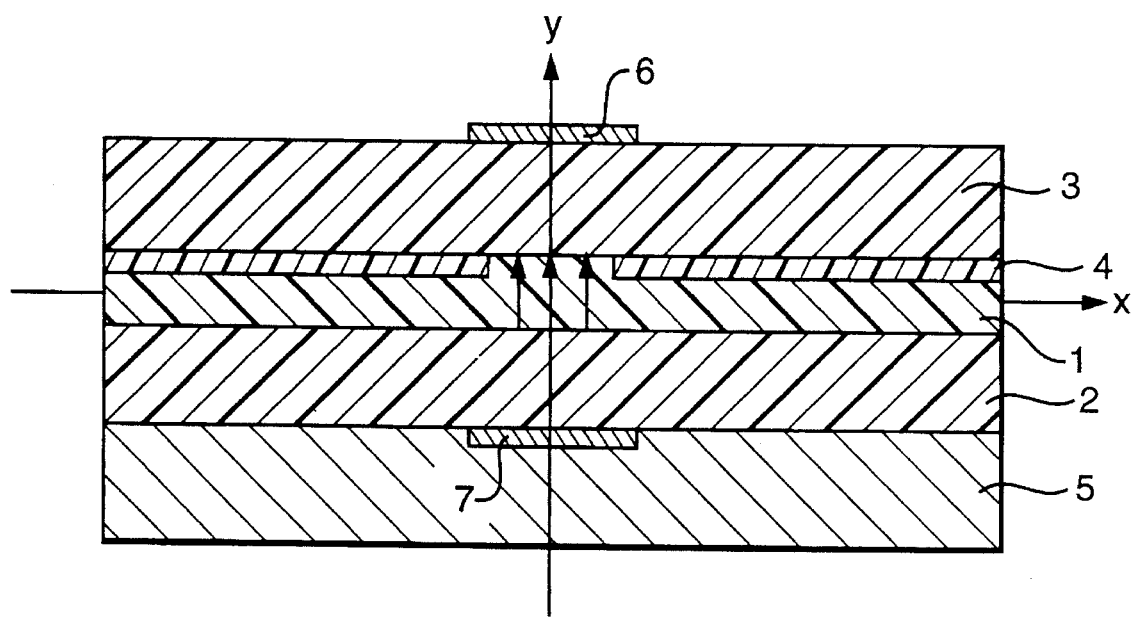

FIGS. 1a and 1b, respectively, show the structure of the TM mode selectors in which nonlinear molecules are vertically poled with respect to the horizontal x-axis. The TE or TM mode selector is operative to selectively pass TE or TM mode when the two modes are both present in the waveguide. It is easy to implement the mode selector by utilizing a poling effect so long as it concerns to a non linear polymer waveguide. Certain of the method for manufacturing the optical waveguide by using the poling effect is illustrated in the article: Thackara, et al., "poled electro-optic waveguide formation in thin-film organic media", Appl. Phys. Lett. vol. 52, pp. 1031–1033, 1988.

Referring to FIGS. 1a and 1b, non linear polymer core layer 1 is vertically poled by means of the poling electrodes 6 and 7. The core layer 1 is surrounded by cladding or buffer layers 2 and 3 which may be made, for example, of nonlinear polymer material or in-organic material. The cladding layers 2 and 3 may be of an optically iostropic material having lower refractive index than the core layer. The cladding layers have their refractive indices lower than that of the core layer in order to cause a total internal reflection of light at the interfaces of each layer.

The light propagating along the waveguide from left to right is confined within core layer 1, because of the lower refractive index of the surrounding cladding layers. In this layered structure, the substrate 5 may be made, for example, of semiconductor material such as GaAs, InP, etc. Since nonlinear polymer has its characteristical feature that the refractive index is increased along the direction of the poling electric field and is decreased along the direction perpendicular to the poling field, we can obtain the structure of FIG. 1a by poling the thin-film planar waveguide with the stripe poling electrodes 6 and 7 having a appropriate width.

Further, it is possible to obtain a TM mode selector by the vertical poling, even when the stripe waveguide of FIG. 1b has already been formed. In this case, the amount of the optical bireferingence must be regulated in such a way that the effective refractive index of the stripe region for the TE mode may be equal to or less than the effective refractive index of the cladding layer. In the structure of FIG. 1b, an intermediate layer 4 having lower refractive index than the core layer 1 is interposed between the core layer 1 and the upper cladding layer 3 for the lateral confinement of the TM mode.

Figure 2A:
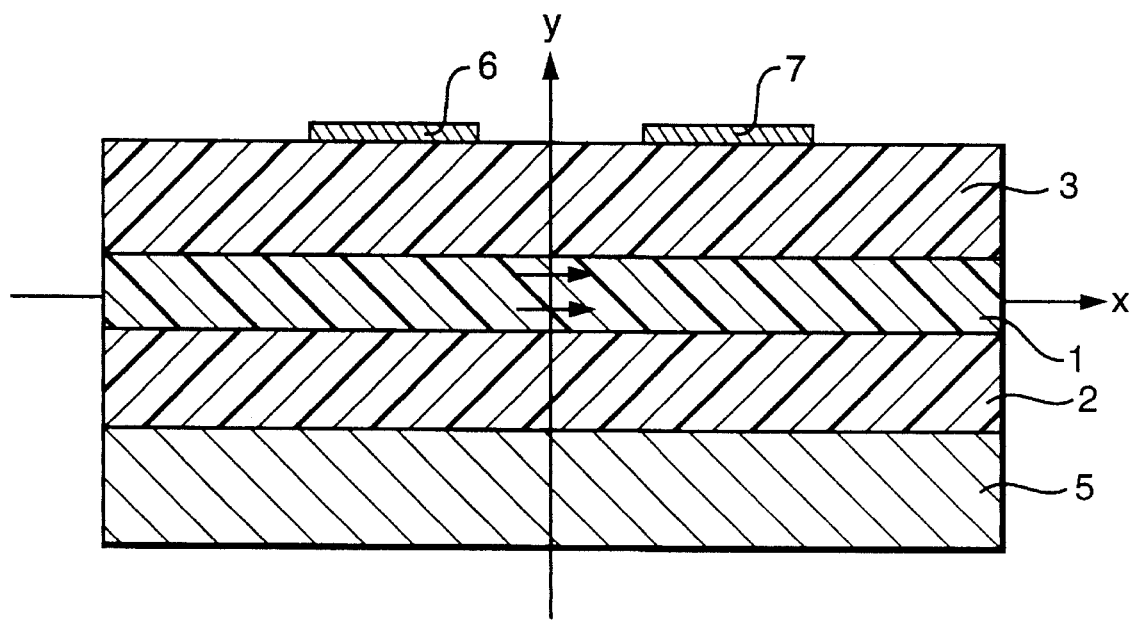
FIGS. 2a and 2b show a cross-sectional view of the TE mode selector according to the present invention formed by a horizontal poling electric field in a stripe waveguide.
Figure 2B:
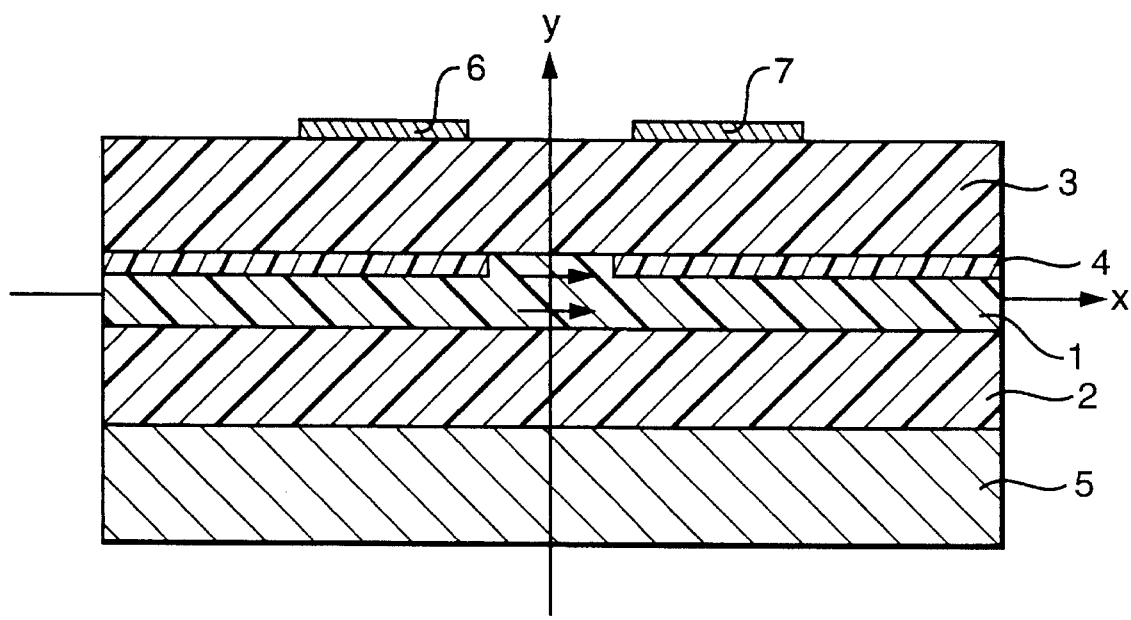

Referring to FIGS. 2a and 2b, the TE mode selector will be explained. FIGS. 2a and 2b show cross-sectional views of the TE mode selector which is formed by the horizontal poling field. As with the description of the TM mode with reference to FIGS. 1a and 1b, the refractive index of the nonlinear polymer layer is increased along the poling axis and is decreased along the direction perpendicular to the poling axis. Accordingly, if we place the poling electrodes in a straight line on the upper cladding layer 3, the poled structure thus formed may be a waveguide through which only TE mode can propagate as seen in FIG. 2a.

It is also possible to implement the TE mode selector in the stripe waveguide structure of FIG. 2b. Similarly, the effective refractive index of the stripe region must be regulated to be equal to or less than that of the cladding layer by controlling the optical bireferingence caused by the poling field.

Now will be explained the TE-TM mode converter in the polymer waveguide.

Figure 3:
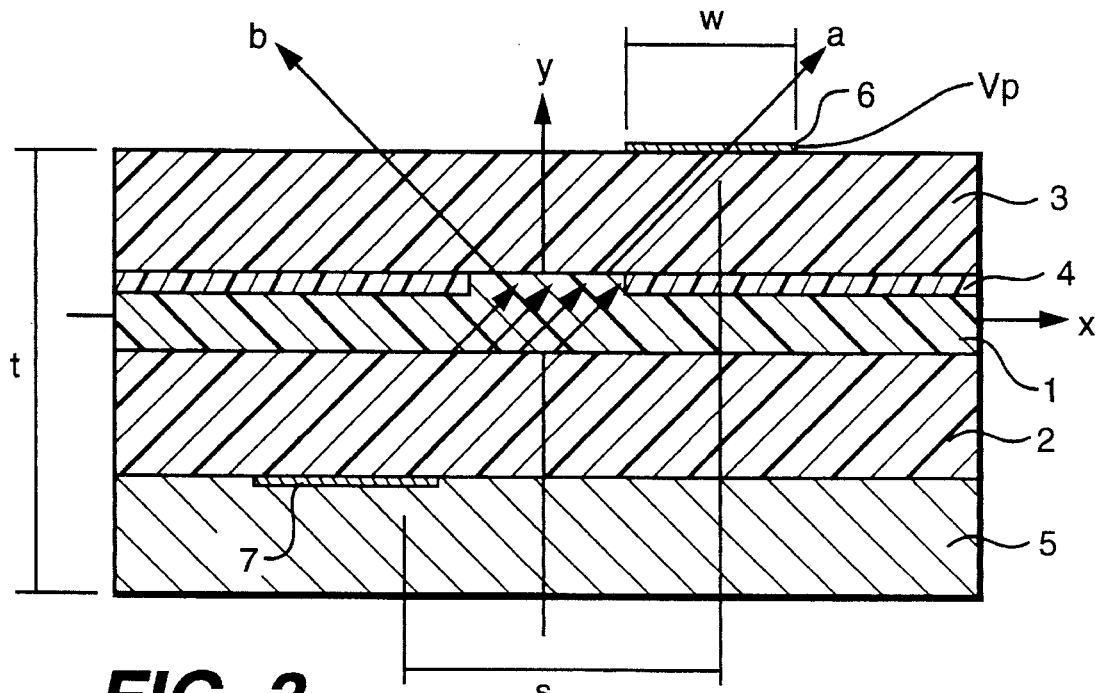
FIG. 3 shows a cross sectional view of the TE-TM mode converter in which nonlinear polymer is poled to 45° direction the x-axis.

FIG. 3 shows a cross-sectional view of the TE-TM mode converter according to the present invention. In the drawing, the direction of the poling electric field around the core layer of the waveguide is approximately 45 degrees to the x-axis. The poling field results in nonlinear molecules doped in the polymer layer being oriented along the direction of the poling field. As a result, the optical axis of the poled polymer layer is formed in the direction of 45 degrees to the x-axis. The principle of the TE-TM mode conversion in this structure will be explained.

When a light having, for example, an $E_x$(TE) polarization is entered, the incident light $E_x$ can be considered to be divided into the normal mode $E_a$ and $E_b$ components, where a-axis and b-axis formed by the poling process are perpendicular to each other and are polarization directions of the normal mode with the waveguide. While the $E_a$ and $E_b$ components propagate independently and without interference along the waveguide, the two modes after passing through the waveguide will have, different optical phases in comparison with the phase of initial incident light due to the optical birefringence of the waveguide.

If the $E_a$ and $E_b$ components are converted again to $E_x$(TE) and $E_y$(TM) at the end of the waveguide, the magnitudes of the $E_x$(TE) and $E_y$(TM) components will change depending on the phase differences between the normal modes. The $E_x$(TE) and $E_y$(TM) components are expressed as:

$$E_x = E_{xo} \cos^2\left(\frac{\delta\phi_n}{2}\right) \quad (1)$$

$$E_y = E_{xo} \sin^2\left(\frac{\delta\phi_B}{2}\right)$$

where, $\delta\phi_D$ is the phase difference between the $E_a$ and $E_b$ components and can be expressed as $$\delta\phi_B = \left(\frac{2\pi L_n}{\lambda}\right)(N_a - N_b)_0 + \quad (2)$$
$$C_{-B}\left(\frac{\pi L_B}{\lambda}\right)(n_a{}^3\gamma_{33} \cdot n_b{}^3\gamma_{13})\left(\frac{V_B}{d}\right)$$

where, $(2\pi L_D/\lambda)(N_a-N_b)_0$ is the phase difference of the $E_a$ and $E_b$ modes before applying the signal electric field, $C_u(\pi L_u/\lambda)(n_a{}^3\gamma_{33}-n_b{}^3\gamma_{13})(V_B/d)$ is the phase difference between the normal modes caused by the applied voltage $V_B$, and $n_a$ and $n_b$ are refractive indices of the polymer thin film along the a-axis and b-axis, respectively.

Equation 1 states that if $\delta\phi_B/2$ is an integer number of times of $\pi$, then an output of the waveguide is $E_x$(TE) as it was in the initial incident state, and if $\delta\phi_B/2$ is an odd integer number of times of $\pi/2$ then $E_x$ is converted to $E_y$(TM). The output states of the TE or TM mode can be described mathematically:

$$TE \rightarrow TE: \frac{\delta\phi_B}{2} = m\pi (m = 0, 1, 2, \dots) \quad (3\text{-}1)$$

$$TE \rightarrow TM: \frac{\delta\phi_B}{2} = m\left(\frac{x}{2}\right)(m = 1, 3, 5, \dots) \quad (3\text{-}2)$$

The other polarization states which can not described by the equation 3-1 and 3-2 are, generally, elliptically polarized light. The above discussion may be similarly applied to the case in which the incident light is in the $E_y$(TM) mode.

In the meantime, since the TE-TM mode converter is carried out mostly when an initial output light before applying the electric potential is in a TE or a TM mode, it is necessary to provide biasing electrodes for regulating the initial state of the output light.

Figure 4:
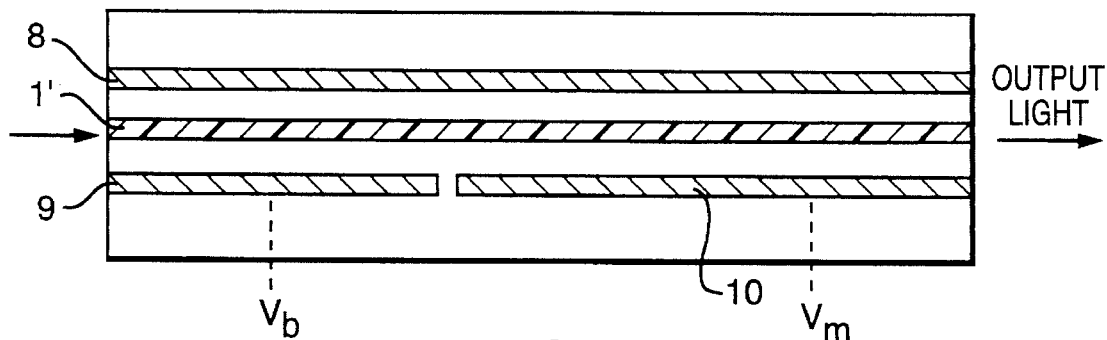
FIG. 4 shows a cross-sectional view of the TE-TM mode converter in which a bias electrode and a signal electrode are separated in order to control an initial output state of the TE-TM mode converter.

FIG. 4 shows the sectional view of the TE-TM mode converter in which the biasing electrode 9 and the signaling electrode 10 are electrically insulated. An incident light propagates through the waveguide 1' to be an output light with its mode converted. Above and below the waveguide 1', there are provided with a lower ground electrode 8, a biasing electrode 9 for supplying a bias voltage $V_b$, and a signaling electrode 10 for applying a modulation voltage $V_m$.

Figure 5:
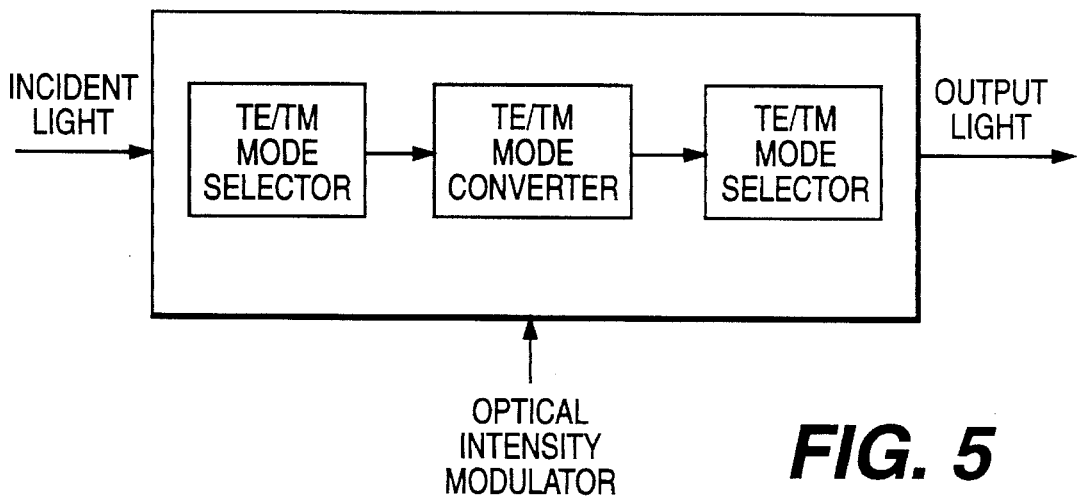
FIG. 5 is a schematic diagram of an exemplary optical waveguide intensity modulator of this invention.

FIG. 5 illustrates the intensity modulator constructed by integrating the above fundamental elements. When a randomly polarized light is incident to the intensity modulator, the mode selector of either FIG. 1 or FIG. 2 may be used as the polarization selectors for input and output elements. If the TE mode selector is chosen for the output element, $E_x$(TE) component is modulated to be emerged out. Otherwise, if the TM mode selector is selected for the output device, $E_y$(TM) component is modulated and output.

Thus, the present invention makes it possible to integrate on a single substrate the TE or TM mode selectors and the TE-TM mode converters which are both necessary for realizing the optical intensity modulator. This integration is accomplished simply by changing the arrangement of the poling electrodes for each element and is simpler in comparison with the conventional Mach-Zehnder interferometer type optical intensity modulator. And, according to the present invention, the loss of a device can be reduced due to the fact that in this structure, curved portion of the Y-branch coupler which may give rise to the loss of the propagating light are not required.

Although, in the foregoing description of this invention is illustrated with reference to the stripe type waveguide with photo-bleached waveguide structure, the present invention is not restricted to this structure, and may be practiced or embodied in still other ways without departing from the spirit or essential character thereof. For example, stripe-loaded waveguide or ridge waveguide may be applied to this invention depending on the fabrication process or materials to be used.

Additionally, the optical waveguide intensity modulator of FIG. 5, which is constructed by a series combination of the first TE or TM mode selector, the TE-TM mode converter and the second TE or TM mode selector, can be simplified. For instance, when the incident light is in the polarization state selected from the TE and TM modes, the first selector can be eliminated, and the second mode selector may be either TE mode selector of FIG. 1 or TM mode selector of FIG. 2.

The preferred embodiments described herein are therefore illustrative and not restrictive, the scope of the invention being indicated by the appended claims and all variations which come within the meaning of the claims are intended to be embraced therein.

What is claimed:

1. An optical waveguide intensity modulator for modulating an intensity of an input light and generating an output light of desired polarization state, said modulator comprising a series of combination of:

a TE-TM mode converting means for selectively converting TE and TM modes of an input light by controlling a phase difference and an amplitude ratio of said two modes, said TE-TM mode converting means having a core layer being poled to substantially 45° direction with respect to a predetermined direction; and a TE or TM mode selecting means connected to said TE-TM mode converting means for modulating a phase difference between a TE mode and a TM mode of an input light, said TE or TM mode selecting means having a core layer being poled to said predetermined direction.

2. The optical waveguide intensity modulator of claim 1, further comprising a further TE or TM mode selecting means for receiving said input light and for selectively passing the TE mode and the TM mode of the input light, said first mode selecting means having a core layer formed of a non-linear polymer material, said core layer being poled to said predetermined direction;

and, in which said TE-TM mode converting means is connected to said further TE or TM mode selecting means and is also for selectively transforming TE and TM modes of an output light from said further mode selecting means by controlling a phase difference and an amplitude ratio of said two modes of the output light of said further mode selecting means;

and in which said TE or TM mode selecting means modulates an output light emanating from said TE-TM mode converting means.

3. The optical waveguide intensity modulator of claim 2 in which said TE or TM mode selecting means and said TE-TM mode converting means comprise a) a semiconductor substrate;

b) a cladding layer formed on said semiconductor substrate;

c) a nonlinear polymer layer having a refractive index different from that of said cladding layer and being formed within said cladding layer;

d) two electrodes for applying a poling electric field formed above and below the cladding layer.

4. The optical waveguide intensity modulator of claim 3, wherein said TE or TM mode selecting means has said poling electrodes arranged horizontally above and below the cladding layer.

5. The optical waveguide intensity modulator of claim 3, in which said TE-TM mode converting means has the poling electrodes constructed with an electrode for applying a bias field and an electrode for applying a signal field, said biasing electrode and signaling electrode being electrically isolated.

6. The optical waveguide intensity modulator of claim 1, in which said TE or TM mode selecting means is to receive said modulator input light and to selectively pass the TE mode and the TM mode of the modulator input light, and has a core layer being poled to said predetermined direction;

and in which said TE-TM mode converting means is to selectively convert TE and TM modes of an output light of said TE or TM mode selecting means by controlling a phase difference and an amplitude ratio of said two modes, and to generate said modulator output light of desired polarization state, and has a core layer being poled to 45° direction with respect to the predetermined direction.

7. The optical waveguide intensity modulator of claim 6 in which said TE or TM mode selecting means and said TE-TM mode converting means comprise a) a semiconductor substrate;

b) a cladding layer formed on said semiconductor substrate;

c) a nonlinear polymer layer having a refractive index different from that of said cladding layer and being formed within said cladding layer;

d) two electrodes for applying a poling electric field formed above and below the cladding layer.

8. The optical waveguide intensity modulator of claim 7, wherein said TE or TM mode selecting means has said poling electrodes arranged horizontally above and below the cladding layer.

9. The optical waveguide intensity modulator of claim 7, in which said TE-TM mode converting means has the poling electrodes constructed with an electrode for applying a bias field and an electrode for applying a signal field, said biasing electrode and signaling electrode being electrically isolated.

10. The optical waveguide intensity modulator of claim 1 in which said TE or TM mode selecting means and said TE-TM mode converting means comprise
   a) a semiconductor substrate;
   b) a cladding layer formed on said semiconductor substrate;
   c) a nonlinear polymer layer having a refractive index different from that of said cladding layer and being formed within said cladding layer;
   d) two electrodes for applying a poling electric field formed above and below the cladding layer.

11. The optical waveguide intensity modulator of claim 10, wherein said TE or TM mode selecting means has said poling electrodes arranged horizontally above and below the cladding layer.

12. The optical waveguide intensity modulator of claim 10, in which said TE-TM mode converting means has the poling electrodes constructed with an electrode for applying a bias field and an electrode for applying a signal field, said biasing electrode and signaling electrode being electrically isolated.

* * * * *